United States Patent Office 3,046,148
Patented July 24, 1962

3,046,148
DENSE, NON-BROWNING, PLATE GLASS COMPOSITION
Earl T. Middleswarth, Cedar Grove, N.J., and James E. Duncan, Natrona Heights, Pa., assignors to Pittsburgh Plate Glass Company, Pittsburgh, Pa., a corporation of Pennsylvania
No Drawing. Filed May 19, 1961, Ser. No. 111,133
8 Claims. (Cl. 106—53)

This invention relates to dense plate glasses and it has particular relation to such glasses which are highly resistant to discoloration by short wave length radiation.

Glasses which are highly resistant to discoloration by short wave length radiation (X or gamma) are desirable for use as observation windows in atomic energy installations. They permit unimpaired viewing of work in a radioactive area. To be useful for such purpose, the glasses must be of good quality, essentially free from bubbles, seed, or striae, and have very little intrinsic color so that they transmit a satisfactory amount of visible light even in thick sections. The glasses should also possess the property of good chemical durability. It is desired that such glasses have a high density since dense glasses have considerably greater shielding powers than regular lime-soda-silica plate glass.

The use of cerium in a glass to prevent discoloration of the glass is known. Cerium prevents browning caused by short wave length irradiation of the glass. Thus, it would seem that the most obvious way to obtain a dense, non-browning plate glass is to add ceric oxide to a known clear glass of appropriate density. Attempts to produce a dense, non-browning plate glass by this method have failed because ordinary clear glasses of density 3.2 to 3.4 grams per cubic centimeter assume a strong intrinsic color when ceric oxide is added to them. Table I, below, lists several examples of ordinary clear dense glasses to which ceric oxide has been added and it is readily seen from the transmittance figures that these glasses possess a strong intrinsic color and are therefore unsatisfactory. The fact that the glasses of Table I have a suitable density and a strong resistance to discoloration by short wave length radiation does not make them acceptable.

*Table I*

| Composition | 1 | 2 | 3 |
|---|---|---|---|
| $SiO_2$ | 41.5 | 44.4 | 34.1 |
| PbO | 5.9 | | |
| BaO | 30.7 | 29.2 | 41.5 |
| $Na_2O$ | 4.6 | 1.7 | 0.5 |
| $K_2O$ | 2.0 | 7.6 | |
| ZnO | 3.1 | 8.3 | 4.5 |
| CaO | 5.3 | | 1.6 |
| $B_2O_3$ | 4.9 | 6.3 | 11.0 |
| $CeO_2$ | 2.0 | 2.0 | 2.0 |
| $Al_2O_3$ | | | 4.8 |
| F | | | 0.8 |
| Total | 100.0 | 100.3 | 100.0 |
| Less oxygen correction | −0.0 | −0.3 | −0.0 |
| Corrected total | 100.0 | 100.0 | 100.0 |
| Density in grams per cubic centimeter | 3.44 | 3.28 | 3.54 |
| Percent luminous transmittance for illuminant "A" (glass thickness of one inch) | 66.5 | 68.1 | 52.7 |

The proportions of the ingredients are set forth above in percent by weight.

It is an object of the present invention to produce a plate glass having a density of about 3.1 to 3.4 which will have little or no intrinsic color, even in sections up to an inch in thickness. It is further an object of this invention to produce such a glass which will not discolor appreciably upon exposure to X or gamma radiation and which will possess good viewing properties and good chemical durability.

In accordance with the present invention, such glasses have been produced. Examples of these glasses and certain of their properties are set forth in Table II, wherein the proportions of the ingredients are set forth in percent by weight:

*Table II*

| Composition | 1 | 2 | 3 | Range | Preferred range |
|---|---|---|---|---|---|
| $SiO_2$ | 45.1 | 50.5 | 48.5 | 42–51 | 42–51 |
| PbO | 31.3 | 31.5 | 35.5 | 30–38 | 30–38 |
| $K_2O$ | 20.0 | 15.2 | 13.2 | 12–22 | 12–22 |
| $CeO_2$ | 1.7 | 1.8 | 1.8 | 0.5–3.0 | 0.7–2.5 |
| F | 0.9 | 0.9 | 0.9 | 0.3–2.0 | 0.5–1.5 |
| $Na_2O$ | | 0.5 | 0.5 | 0–1.5 | 0–1.0 |
| CaO | 1.4 | | | 0–2.0 | 0–2.0 |
| Total | 100.4 | 100.4 | 100.4 | | |
| Less oxygen correction | −0.4 | −0.4 | −0.4 | | |
| Corrected total | 100.0 | 100.0 | 100.0 | | |
| Density, grams per cubic centimeter | 3.24 | 3.18 | 3.29 | | |
| Percent luminous transmittance for illuminant "A" (glass thickness of one inch) | 87.6 | 88.4 | 87.3 | | |

The glasses of the present invention are made from conventional batch ingredients. These ingredients include sand, litharge, potassium carbonate, potassium nitrate, cerous oxalate, sodium silicofluoride and fluorspar. The batch ingredients are thoroughly mixed in the proportions necessary to prepare the glasses of the invention. Various size pots or crucibles may be employed and the temperatures and times of melting will vary according to the amount of glass being formed. The melting conditions herein recited may be employed to make 85 to 100 pounds of these glasses in clay pots in a furnace heated by the controlled combustion of natural gas.

The empty pot is preheated in a furnace at a furnace temperature of about 2200° F. A portion of the mixed batch is ladled into the preheated pot and the furnace temperature gradually increased. Over a period of 2½ hours the remaining portion of the mixed batch is ladled into the pot and the temperature is raised gradually to about 2500° F. The temperature of 2500° F. is maintained for about 2 to 2½ hours, during which time the batch is melted, the chemical reactions are completed and the glass becomes substantially free of bubbles. During the melting and high temperature reacting periods just described, a neutral or slightly oxidizing atmosphere is maintained within the furnace. This insures that the lead oxide is not reduced.

Stirring of the glass is begun approximately ½ hour after the glass has melted and is continued for about ½ hour while the glass is maintained at a temperature of 2500° F. The stirring is performed to prevent the dense melt constituents from sinking to the bottom of the pot and causing inhomogeneity in the glass. The glass is stirred by mechanically propelling a refractory thimble through the glass in a circular or spiral motion. The thimble is supported by a water cooled core and a driving arm which are mounted vertically in the pot.

After the glass has become substantially free of bubbles, the temperature of the furnace is lowered in about 10 minutes to about 2350° F. and held at this temperature for about 15 minutes. The furnace temperature is then reduced gradually over 1½ hours with stirring to about 1900° F. The pot of glass is then removed from the furnace, the glass is poured on a metal table and is rolled into the form of a plate. The plate is placed in a kiln and cooled from 1050° F. to 840° F. at the rate of about 5° F. per minute. Thereafter, it is cooled more rapidly to room temperature and may be ground and polished according to conventional plate glass manufacturing processes.

The amounts of the various components of the glass may vary. The ranges set forth above describe approximate limitations which these variations may take and remain within the purview of the invention. For example, $SiO_2$ is employed in the glass in the amount stated because greater than 51 percent by weight $SiO_2$ lowers the density, whereas, less than 42 percent by weight $SiO_2$ unduly decreases the chemical durability of the glass. The amount of PbO should not be greater than 38 percent by weight because greater amounts increase the intrinsic color of the glass. If less than 30 percent by weight PbO is employed, the density of the glass is not high enough.

$K_2O$ must be employed within the percentages set forth above to obtain the desired density and chemical durability. Greater than 22 percent $K_2O$ by weight lowers the density and decreases the chemical durability of the glass, whereas, less than 12 percent by weight $K_2O$ decreases the meltability of the glass.

The amount of $CeO_2$ in the glass must be controlled carefully. Each of the observation windows in an atomic energy installation comprises conventionally a number of relatively thick glass panels. When each panel of a window is made of the same glass composition with respect to the amount of $CeO_2$, this $CeO_2$ content must be carefully controlled. If greater than 2 percent by weight of $CeO_2$ is present, the intrinsic color of the glass is increased objectionably. Less than 1 percent by weight $CeO_2$ allows discoloration of the glass when it is subjected to radiation by X or gamma rays. In another type of observation window, the relatively thick glass panels are made of glass compositions that contain different amounts of $CeO_2$. For example, one observation window includes six glass panels, each about 9 inches in thickness. The innermost glass panel, i.e., the panel closest to the radiation source, has a glass composition with a $CeO_2$ content greater than 2 percent, e.g., 2.4 percent. The three outermost panels each have a glass composition with a $CeO_2$ content less than 1 percent, e.g., 0.8 percent. The two panels between those panels of glass containing 2.4 percent $CeO_2$ and 0.8 percent $CeO_2$ are made of a glass composition containing between 1 and 2 percent $CeO_2$, e.g., 1.9 percent $CeO_2$. This type of window has the $CeO_2$ content placed so that the highest percentage of $CeO_2$ is closest to the radiation source. Thus, the $CeO_2$ content is, in effect, graduated through the window.

If more than 2 percent by weight of F is present, the glass will tend to become opalescent, but at least 0.4 percent by weight of F must be employed to increase the meltability of the glass and minimize its intrinsic color. The fluorine shown in the composition in the tables is understood to be present in the glasses in some combined form but not as a gas. It is not known exactly how this fluorine is combined, but it is probably combined as a fluoride such as KF, NaF or $CaF_2$.

In an analysis of a glass it is customary to analyze only for the elements and then list the presence of these elements in the glass as oxides. In the cases where some fluorine is present, it is probably present as a fluoride compound with a cation in the glass and thus replaces a stoichiometric equivalent of oxygen in this cation. Thus, it is convenient to show the amount of fluorine in percent by weight as fluorine and then subtract from the sum total percentage of the glass composition based on oxides, its stoichiometric equivalent of oxide in percent by weight.

At least 96.5 percent by weight, and preferably at least 97 percent by weight, of the glass is made up of the essential ingredients, $SiO_2$, PbO, $K_2O$, $CeO_2$ and F. Small amounts of other materials are permissible. For example, up to 2 percent by weight CaO and up to 1.5 percent by weight $Na_2O$ may be employed to increase the meltability of the glass. If more than 2 percent CaO is employed, the intrinsic color of the glass is too great. If more than 1.5 percent by weight $Na_2O$ is present, the intrinsic color of the glass is too great and the chemically durability of the glass is harmfully lowered.

To better define the preferred ranges of oxides applicable to this invention Table III, below, lists oxide compositions in percent by weight of certain glasses which lie near to, but outside of the preferred ranges of the present invention. The density and luminous transmittance (through a one-inch thickness) for each of these glasses is also listed in Table III. The luminous transmittance is an index of intrinsic color. It should be noted that small differences in the transmittance of two glasses at a one-inch thickness are greatly magnified when the glass is employed in such use as an observation window in an atomic energy installation where the windows may be as much as 36 inches in thickness. For example, if two glasses of refractive index 1.588 have a transmittance of 88 percent and 87 percent at a glass thickness of one inch, they will have a transmittance of about 52 percent and 40 percent, respectively, at a thickness of twenty-four inches.

*Table III*

| Composition | 1 | 2 | 3 | 4 |
|---|---|---|---|---|
| $SiO_2$ | 44.9 | 51.6 | 50.5 | 45.0 |
| PbO | 44.6 | 28.9 | 31.6 | 34.7 |
| $K_2O$ | 6.4 | 9.5 | 9.4 | 16.4 |
| $CeO_2$ | 2.0 | 2.0 | 1.8 | 1.8 |
| F | | | 0.9 | |
| $Na_2O$ | 2.1 | 1.8 | 6.2 | 2.1 |
| CaO | | 6.2 | | |
| Total | 100.0 | 100.0 | 100.4 | 100.0 |
| Less oxygen correction | −0.0 | −0.0 | −0.4 | −0.0 |
| Corrected total | 100.0 | 100.0 | 100.0 | 100.0 |
| Density in grams per cubic centimeter | 3.55 | 3.16 | 3.20 | 3.29 |
| Percent luminous transmittance for illuminant "A" (glass thickness of one inch) | 80.4 | 75.8 | 84.1 | 85.2 |

In Table III, composition 1 is a fluorine-free glass, too rich in PbO. Composition 2 is a fluorine-free glass, too rich in CaO. Composition 3 contains fluorine, but is too rich in $Na_2O$. Composition 4 is a fluorine-free glass with a little too much $Na_2O$. Its transmittance is fairly high and its color is relatively weak. If approximately 1 percent by weight of fluorine is added to the glass of composition 4, the transmittance at one inch thickness is increased by about ½ percent and the color of the glass is noticeably decreased.

In Tables IV and V below are set forth the compositions and luminous transmittance values of glasses of the present invention as Examples 3, 4, 5 and 6, along with Examples 1 and 2 of glasses that are similar except they do not have an F content which is a necessary part of the glasses of this invention. The proportions of the ingredients are set forth in percent by weight.

*Table IV*

| Composition | 1 | 2 | 3 | 4 | 5 | 6 |
|---|---|---|---|---|---|---|
| $SiO_2$ | 48.02 | 45.89 | 45.56 | 44.68 | 47.20 | 46.94 |
| PbO | 37.09 | 37.02 | 37.12 | 37.19 | 35.98 | 36.67 |
| $Na_2O$ | 1.00 | 1.00 | 1.01 | 1.02 | 0.45 | 0.99 |
| $K_2O$ | 9.83 | 12.00 | 12.03 | 12.11 | 14.21 | 13.12 |
| CaO | 1.97 | 2.00 | 2.01 | 2.02 | | |
| $CeO_2$ | 2.00 | 2.00 | 2.01 | 2.01 | 1.69 | 1.72 |
| $Al_2O_3$ | 0.08 | 0.08 | 0.08 | 0.08 | 0.08 | 0.08 |
| $Fe_2O_3$ | 0.01 | 0.01 | 0.01 | 0.01 | 0.01 | 0.01 |
| F | | | 0.30 | 1.51 | 0.65 | 0.81 |
| Total | 100.00 | 100.00 | 100.13 | 100.63 | 100.27 | 100.34 |
| Less oxygen correction | | | −0.13 | −0.63 | −0.27 | −0.34 |
| Corrected total | 100.00 | 100.00 | 100.00 | 100.00 | 100.00 | 100.00 |

Table V

| Class of Table IV | Luminous transmittance, Percent | | Thickness of sample, |
|---|---|---|---|
| | Solar light | Illuminant "C" | |
| 1 | 84.0 | 83.7 | 1.003 |
| 2 | 83.2 | 82.9 | 1.000 |
| 3 | 84.8 | 84.6 | 0.998 |
| 4 | 85.2 | 85.0 | 1.000 |
| 5 | 85.8 | 85.7 | 1.000 |
| 6 | 86.0 | 85.9 | 0.998 |

The percentage of ingredients of the compositions of Table IV are calculated values, except for the actual fluorine analysis of composition 3, on the basis of the amounts of starting materials. For glass composition 4, 5 and 6, which contain fluorine, the percentages of the ingredients are calculated on the basis of a 20 percent loss of fluorine content in the preparation of these glass compositions. The glass of composition 3 on the basis of a 20 percent loss of fluorine content would be stated in Table III as containing 0.4 percent fluorine.

The glass compositions 1 and 2 of Table IV contain no fluorine. The glass compositions 1 and 2, especially glass composition 2, have lower luminous transmittance than glass compositions 3 and 4, which also contain approximately 2 percent CaO. As mentioned above, these differences in the visual transmittance between the glass compositions 1 and 2 and the glass compositions 3 and 4 of Tables IV and V for one-inch thick samples are greatly magnified when the glass is employed in thick observation windows.

The greater luminous transmittance of the glass compositions 5 and 6 as compared with the glass compositions 3 and 4 of Table IV can be attributed to the slightly lower PbO content and the absence of CaO in glass compositions 5 and 6.

Table VI, below, presents the compositions in percent by weight of two glasses which are used to make the innermost and outermost glass panels of the window in which the outer panels have a $CeO_2$ content less than 1 percent and in which the inner panel has the $CeO_2$ content greater than 2 percent.

Table VI

| Composition | 1 | 2 |
|---|---|---|
| $SiO_2$ | 48.19 | 47.85 |
| PbO | 36.28 | 35.12 |
| $Na_2O$ | 0.45 | 0.45 |
| $K_2O$ | 13.80 | 13.70 |
| $CeO_2$ | 0.80 | 2.41 |
| $Al_2O_3$ | 0.08 | 0.08 |
| $Fe_2O_3$ | 0.01 | 0.01 |
| F | 0.67 | 0.66 |
| Total | 100.28 | 100.28 |
| Less oxygen correction | −0.28 | −0.28 |
| Corrected total | 100.00 | 100.00 |

Table VII presents the composition in percent by weight based on chemical analysis of a glass of the present invention utilized for the intermediate panels of the window using glass compositions 1 and 2 of Table VI for the outer and innermost panels.

Table VII

| Composition | 1 |
|---|---|
| $SiO_2$ | 47.53 |
| PbO | 35.36 |
| $Na_2O$ | 0.24 |
| $K_2O$ | 14.40 |
| CaO | 0.03 |
| $CeO_2$ | 1.86 |
| $Al_2O_3$ | 0.06 |
| $Fe_2O_3$ | 0.011 |
| F | 0.58 |
| $Na_2SO_4$ | 0.05 |
| NaCl | 0.09 |
| Rare earth oxides | 0.03 |
| Total | 100.24 |
| Less oxygen correction | −0.24 |
| Corrected total | 100.00 |

The glasses of the present invention presented as glass compositions 3 through 6 of Table IV which are calculated percentages, except for fluorine content as mentioned above, can be made from conventional batch ingredients which have been mentioned above. Similarly mixtures of these conventional batch ingredients can be used to make the glass compositions 1 and 2 of Table VI. The mixture of conventional batch ingredients for these six glasses are presented below in Table VIII.

Table VIII

| Conventional batch ingredients | Glass compositions of Table IV | | | | Glass composition of Table VI | |
|---|---|---|---|---|---|---|
| | 3 | 4 | 5 | 6 | 1 | 2 |
| | Pounds | Pounds | Pounds | Pounds | Pounds | Pounds |
| Sand | 1,000.0 | 965.0 | 1,042.0 | 1,032.0 | 1,048.0 | 1,048.0 |
| Litharge | 817.0 | 817.0 | 800.0 | 814.0 | 795.0 | 775.0 |
| Soda ash | 27.8 | | | 16.9 | | |
| Potassium carbonate | 282.2 | 284.0 | 348.0 | 302.5 | 348.0 | 348.0 |
| Potassium nitrate | 164.5 | 164.5 | 180.0 | 192.6 | 150.0 | 150.0 |
| Calcium carbonate | 79.4 | 79.4 | | | | |
| Sodium silicofluoride | 18.2 | 68.3 | 30.0 | 37.0 | 30.0 | 30.0 |
| Cerous oxalate | 91.8 | 91.8 | 78.0 | 79.6 | 37.0 | 102.0 |

In the manufacture of the dense, non-browning plate glasses of this invention, every effort should be made to keep them free from extraneous materials such as iron, since these materials tend to cause strong intrinsic color, even when present in very minor amounts.

The glasses of the present invention have been tested by exposure to X and gamma radiation. At the end of these tests, the glass continued to permit high transmittance in the visible wave length region and exhibit high resistance to X and gamma radiation discoloring. The tests consisted of measuring the luminous transmittance of the various glasses before and after exposure to X or gamma radiation. Glasses of compositions 1 and 2 of Table II were exposed to gamma radiation from a cobalt source in the amount of about 350,000 and 200,000 roentgens, respectively. Glass of composition 3 of Table II was exposed to 500,000 roentgens of X-radiation in a time of less than six hours. None of the three glasses decreased more than ½ percent in luminous transmittance. This shows that all were very nearly free from discoloration, even after exposure to intensive X or gamma radiation.

Although the present invention has been described with respect to specific details of certain embodiments thereof, it is not intended that such details act as limitations upon the scope of the invention except insofar as included in the accompanying claims.

This application is a continuation-in-part of our copending application Serial No. 547,042, filed November 15, 155, now abandoned, a continuation-in-part of our copending application Serial No. 757,929, filed August 29, 1958, now abandoned, and a continuation-in-part of our copending application Serial No. 64,274, filed October 24, 1960 and now abandoned.

We claim:

1. A glass consisting of the following ingredients in percent by weight: 42 to 51 percent $SiO_2$, 30 to 38 percent PbO, 12 to 22 percent $K_2O$, 0.3 to 2 percent F, 0.5 to 3 percent $CeO_2$, 0 to 2 percent CaO and 0 to 1.5 percent $Na_2O$, said F being present in said glass to provide an increase in luminous transmittance.

2. A glass consisting of the following ingredients in percent by weight: 42 to 51 percent $SiO_2$, 30 to 38 percent PbO, 12 to 22 percent $K_2O$, 0.5 to 1.5 percent F, 0.7 to 2.5 percent $CeO_2$, 0 to 2 percent CaO and 0 to 1 percent $Na_2O$, said F being present in said glass to provide an increase in luminous transmittance.

3. The glass of claim 2 wherein the $CeO_2$ content is 0.8 percent and the F content is 0.67 percent.

4. The glass of claim 2 wherein the $CeO_2$ content is 2.4 percent and the F content is 0.66 percent.

5. The glass of claim 2 wherein the $CeO_2$ content is 1.9 percent and the F content is 0.58 percent.

6. A glass having the following approximate composition in percent by weight: 45.1 percent $SiO_2$, 31.3 percent PbO, 20 percent $K_2O$, 1.7 percent $CeO_2$, 1.4 percent CaO and 0.9 percent F, the total exceeding 100 percent by an amount of oxygen stoichiometrically equivalent to the amount of fluorine present, said amount of oxygen not being present in the glass and said F being present in said glass to provide an increase in luminous transmittance.

7. A glass having the following approximate composition in percent by weight: 50.5 percent $SiO_2$, 31.5 percent PbO, 15.2 percent $K_2O$, 1.8 percent $CeO_2$, 0.5 percent $Na_2O$ and 0.9 percent F, the total exceeding 100 percent by an amount of oxygen stoichiometrically equivalent to the amount of fluorine present, said amount of oxygen not being present in the glass and said F being present in said glass to provide an increase in luminous transmittance.

8. A glass having the following approximate composition in percent by weight: 48.5 percent $SiO_2$, 35.5 percent PbO, 13.2 percent $K_2O$, 1.8 percent $CeO_2$, 0.5 percent $Na_2O$ and 0.9 percent F, the total exceeding 100 percent by an amount of oxygen stoichiometrically equivalent to the amount of fluorine present, said amount of oxygen not being present in the glass and said F being present in said glass to provide an increase in luminous transmittance.

References Cited in the file of this patent

UNITED STATES PATENTS

| | | |
|---|---|---|
| 2,579,709 | Smith | Dec. 25, 1951 |
| 2,856,303 | Armistead | Oct. 14, 1958 |

UNITED STATES PATENT OFFICE
CERTIFICATE OF CORRECTION

Patent No. 3,046,148　　　　　　　　　　　　　　　　July 24, 1962

Earl T. Middleswarth et al.

It is hereby certified that error appears in the above numbered patent requiring correction and that the said Letters Patent should read as corrected below.

Column 4, line 3, for "chemically" read -- chemical --; column 5, Table V, heading to column 1 thereof, for "Class of Table IV" read -- Glass of Table IV --; same Table V, heading to column 4 thereof, for "Thickness of sample," read -- Thickne of sample, inch --; column 6, line 73, for "155" read -- 1955 - column 8, line 21, for "nous." read -- nous --.

Signed and sealed this 3rd day of December 1963

(SEAL)
Attest:

ERNEST W. SWIDER　　　　　　　　　　　　　　　EDWIN L. REYNOLDS

Attesting Officer　　　　　　　　　　　Acting Commissioner of Patents